United States Patent [19]
Tamagawa et al.

[11] Patent Number: 4,614,688
[45] Date of Patent: Sep. 30, 1986

[54] SUPPORT FOR PHOTOGRAPHIC PAPER

[75] Inventors: Shigehisa Tamagawa; Takashi Takayanagi, both of Shizuoka, Japan

[73] Assignee: Fuji Photo Film Co., Ltd., Kanagawa, Japan

[21] Appl. No.: 668,778

[22] Filed: Nov. 6, 1984

[30] Foreign Application Priority Data

Nov. 7, 1983 [JP] Japan ................................ 58-208566

[51] Int. Cl.[4] ........................ B32B 5/16; B32B 27/10; B32B 27/08

[52] U.S. Cl. .................................... 428/331; 428/451; 428/513; 428/514; 428/519; 428/476.9; 428/520; 430/536; 430/538

[58] Field of Search ............... 428/513, 514, 331, 451, 428/519, 520

[56] References Cited

U.S. PATENT DOCUMENTS

| | | | |
|---|---|---|---|
| 4,433,030 | 2/1984 | Tamagawa et al. | 428/513 |
| 4,447,524 | 5/1984 | Uno et al. | 428/513 |
| 4,500,598 | 2/1985 | Titoese | 428/513 |

*Primary Examiner*—P. C. Ives
*Attorney, Agent, or Firm*—Sughrue, Mion, Zinn, Macpeak, and Seas

[57] ABSTRACT

A photographic paper support having superior moisture resistance and graphic properties is provided. The support has formed on its back surface a graphic property-imparting layer. The layer is composed of (a) an inorganic pigment having a number average particle diameter of from 0.2 to 2.0 microns and an oil absorbing degree of not more than 100 cc/100 g and (b) a resin cured by irradiation with electron beams.

6 Claims, No Drawings

SUPPORT FOR PHOTOGRAPHIC PAPER

FIELD OF THE INVENTION

This invention relates to a support for photographic paper, and particularly to a water-resistant photographic paper resulting from coating of the surface of a base paper with a polyolefin. More specifically, this invention pertains to a support for photographic paper having excellent moisture resistance and good graphic properties by ink, ball-point pens, pencils and the like.

BACKGROUND OF THE INVENTION

Baryta paper has long been used as photographic paper. In order to increase the speed of development, so-called water-resistant photographic paper obtained by coating both surfaces of base paper with a polyolefin was developed, and now accounts for a greater part of photographic papers used. Usually, the water-resistant photographic paper has a photographic emulsion layer on one surface thereof (generally a polyolefin layer containing an inorganic pigment such as titanium oxide, $TiO_2$).

The other surface on which no emulsion layer is formed desirably has graphic properties and printability by ball-point pens, fountain pens, pencils, oily inks, waterbase inks, etc. for various purposes.

However, since the water-resistant photographic paper is coated with a polyolefin which is most generally polyethylene, its surface is hydrophobic and non-absorbent, and as such, it is difficult to write on it by pencils, fountain pens and the like. It further has the defect that the writing causes scratches, or by slight rubbing after writing, the letters may disappear or blur.

Heretofore, graphic properties, and printability have been imparted to a polyolefin layer by, for example, a method comprising roughening its surface by sand blasting, embossing, etc., and a method comprising roughening its surface by etching it with an acid. The polyolefin layer so treated still does not have entirely satisfactory graphic properties.

Various attempts have been made to overcome these defects. For example, a method has been disclosed comprising including an inorganic pigment having a size of from 1 to 40 microns in the polyolefin layer on the back of water resistant photographic paper as described in Japanese patent application (OPI) No. 43528/1980 (the term "OPI" as used herein refers to a "published unexamined Japanese patent application); a method comprising forming a layer composed of a water-soluble polymer such as polyvinyl alcohol or carboxymethyl cellulose and aqueous silica sol on the polyolefin layer as described in Japanese Patent Publication No. 14884/1969, a method comprising forming a layer composed of a water-insoluble polymer emulsion such as a polyethylene emulsion and aqueous silica sol as described in Japanese Patent Publication No. 36565/75, and a method comprising forming a coated layer having hygroscopicity and containing a pigment such as clay as described in Japanese Laid-Open Utility Model Application No. 169426/1977.

These known methods, however, all have defects. For example, the method comprising including an inorganic pigment having a size of from 1 to 40 microns in the polyolefin resin layer has poor practicability because the photographic paper has reduced quality owing to cracking of the resin film and contamination caused by the pigment. Furthermore, with coated layers of conventional compositions the amount of coating should be increased to about 5 $g/m^2$, and in some cases more than 10 $g/m^2$, in order to obtain sufficient graphic properties, especially graphic properties by pencils, and the preparation of such coated layers has been restricted in many respects, for example, in regard to the drying step.

The qualitative defect is that in the step of development, these coated layers may peel off or dissolve, or after the development, the pigment comes off even by slight rubbing. Thus, these prior methods have failed to give products satisfying any of these properties.

On the other hand, in order to increase the resolving power of the water-resistant photographic paper, a method has been proposed in which a resin layer cured by electron beam irradiation is coated on both surfaces of base paper as a support, as described in Japanese Patent Application (OPI) Nos. 27257/1982 and 49946/1982. However, the resin layer coated on the back surface of the photographic paper support obtained by such a method is hydrophobic and non-absorbent, and as such, it is difficult to write on it with inks, ball-point pens, pencils, etc. Furthermore, it has the defect that during writing, scratchs may be caused, or by slight rubbing after writing, the writing may disappear or blur.

SUMMARY OF THE INVENTION

It is an object of this invenion to provide a support for photographic paper having excellent graphic properties in which the graphic properties are imparted efficiently to the polyolefin layer by a minimum amount of coating and the coated layer does not dissolve or come off during or after development.

According to this invention, the above object is achieved by a support for photographic paper, said support having formed on a back surface thereof (i.e., the opposite surface from the surface on which a photographic image is formed) a graphic property-imparting layer composed of (a) an inorganic pigment having a number average particle diameter of from 0.02 to 2.0 microns and an oil absorbing degree of not more than 100 cc/100 g and (b) a resin cured by irradiation of electron beams.

DETAILED DESCRIPTION OF THE INVENTION

The support for photographic paper in accordance with this invention is composed of a base paper or polyolefin resin coated layers formed on both surfaces thereof, and the graphic property-imparting layer formed on the polyolefin resin layer on the back surface of the support.

The base paper used as the support of the invention is selected from materials generally used in photographic papers. It is composed of natural pulp such as pulps from coniferous and broad-leaved trees as a main raw material, and, as required, may contain various sizing agents, paper strength increasing agents, fillers, fixing agents, etc., and usually has a thickness of from 50 to 300 microns.

Examples of the polyolefin resin composition forming the polyolefin resin coated layer of the support of this invention include homopolymers of alpha-olefins such as polyethylene and polypropylene, and copolymers of alpha-olefins. High-density polyethylene, low-density polyethylene, or a mixture of both is preferred. The thickness of the resin layer is usually from 15 to 50 microns. As required, pigments fluorescent bleaching agents, antioxidants, etc., may be incorporated into the resin layer.

In the support for photographic paper in accordance with this invention, there can be also used the support for photographic paper prepared by applying a white inorganic pigment composed mainly of titanium oxide and/or barium sulfate and a resin layer cured by electron beams on the surface of base paper composed mainly of natural pulp, and directly applying a graphic property-imparting layer composed of an inorganic pigment having a number average particle diameter of from 0.2 to 2.0 microns and an oil absorbing degree of not more than 100 cc/100 g and a resin layer cured by electron beams on the back surface of the base paper.

A compound curable by electron beams which is used in the graphic property-imparting layer of the support of this invention may, for example, be a compound having a double bond in the molecule, preferably a compound having two or more double bonds in the molecule, and more preferably a compound containing an acryloyl group, a methacryloyl group, an acrylamide group, an allyl group, a vinyl ether group, a vinyl thioether group, etc., and an unsaturated polyester.

The inorganic pigment used in the graphic property-imparting layer has a number average particle diameter of from 0.2 to 2.0 microns, and preferably 0.3 to 1.5 microns, and an oil absorbing degree of not more than 100 cc/100 g, preferably 80 to 40 cc/100 g. For pencil writability, crystalline silica or synthetic alumina silica is especially preferred as the inorganic pigment. When the particle diameter of the inorganic pigment is smaller than the specified lower limit, the writability of the resulting layer especially with pencils is abruptly reduced. If the particle diameter is larger than the specified upper limit, the resulting layer has graphic properties but gives a roughened feeling. Also, the layer comes off from the coated polyolefin layer or the base paper during or after development. If the oil absorbing degree of the inorganic pigment becomes at least more than 100 cc/100 g, blotting of an oily ink on the graphic property-imparting layer increases.

The thickness of the graphic property-imparting layer in accordance with this invention is preferably about 0.5 to 5μ when its layer is formed on the polyolefin layer applied on the base paper and preferably about 5 to 20μ when its layer is directly formed on the base paper.

In addition to the electron beam-cured compound and the inorganic pigment, the above layer may further include a monomer having at least one carbon-carbon unsaturated bond in the molecule and/or an organic solvent, if desired. Examples of the monomer having one unsaturated bond in the molecule are acrylic acid, methacrylic acid, methyl acrylate, methyl methacrylate, styrene, acrylonitrile, vinyl acetate and homologs thereof. Examples of compounds having two or more unsaturated bonds in the molecule are the compounds exemplified in a Japanese-language publication *Collection of Data on Photosensitive Resins,* published by Soken Kagaku Kenkyusho Co., Ltd., pages 235–236 (1968). Of the described compounds, preferred are ethylene diacrylate, glycerol diacrylate, pentaerythritol tetramethacrylate, 1,5-pentanediol dimethacrylate and glycerol trimethacrylate. Exampes of the organic solvent include ketones such as acetone, methyl ethyl ketone, methyl isobutyl ketone and cyclohexanone; esters such as methyl acetate, ethyl acetate, butyl acetate, ethyl lactate and glycol monoethyl ether acetate; glycol ethers such as ether, glycol dimethyl ether, glycol monoethyl ether and dioxane; aromatic hydrocarbons such as benzene, toluene, and xylene; and chlorinated hydrocarbons such as methylene chloride, ethylene chloride, carbon tetrachloride, chloroform, ethylene chlorohydrin, and dichlorobenzene.

The weight ratio of the compound (including a monomer) to be cured with electron beams to the inorganic pigment is preferably from 3/1 to $\frac{1}{3}$. When the weight ratio of the inorganic pigment is smaller than this range, the graphic properties are reduced, and when its weight ratio is larger than this range, the curling balance with the front surface resin layer be adversely affected.

For kneading the coating solution, the pigment and the aforesaid ingredients may be placed in a mixing devices all at once, or individually and successively. A dispersing agent may be added together with the pigment.

Various mixing devices are used for kneading and dispersing. Examples include a two-roll mill, a three-roll mill, a ball mill, a pebble mill, a trommel, a sand grinder, a Szegvari attriter, a high-speed impeller dispersing machine, a high-speed stone mill, a high-speed impact mill, a disperser, a kneader, a high-speed mixer, a homogenizer, and an ultrasonic dispersing machine.

Techniques relating to kneading and dispersing are described in T. C. Patton, *Paint Flow and Pigment Dispersion,* published by John Wiley & Sons, Inc. (1964), U.S. Pat. Nos. 2,581,414 and 2,855,156, etc.

The aforesaid composition can be coated on the support by various known methods such as air doctor coating, blade coating, air knife coating, squeeze coating, dip coating, reverse roll coating, transfer roll coating, gravure coating, kiss coating, cast coating, spray coating, and spin coating. Other methods can also be used. Specific description of such methods is provided in detail in a Japanese-language publication *Coating Engineering,* pages 253–277, published on Mar. 20, 1971, by Asakura Shoten.

Electron beam accelerators of the Van de Graaff type operable by the scanning method, the double scanning method or the curtain beam method may be employed for radiation curing of resin. The curtain beam method is preferred because it can provide a large output at relatively low cost. The acceleration voltage typically is from 100 to 1,000 KV, preferably from 100 to 300 KV, and the absorption dose typically is from 0.5 to 20 Mrads, and preferably from 2 to 10 Mrads. When the acceleration voltage is less than 100 KV, the amount of energy transmitted is insufficient. If it exceeds 1,000 KV, the efficiency of energy used in the polymerization is decreased, and it is less economical. If the absorption does is less than 0.5 Mrad, the curing reaction is insufficient, and the desirable quality cannot be obtained. If it exceeds 20 Mrads, the efficiency of energy used in the curing is decreased, or the material to which the electron beams are applied generates undesirable heat.

The following examples illustrate the present invention specifically. It should be understood that the invention is not limited to these examples. Unless otherwise indicated, all parts, percents, ratio and the like are by weight.

EXAMPLE 1

Each of the six compositions shown in Table 1 was coated to form a layer having a dry thickness of 1 micron on the back surface of a polyethylene coated paper (base paper having a thickness of 150 microns coated with a polyethylene layer having a thickness of 30 microns on its front surface and a polyethylene layer having a thickness of 28 microns on its back surface), and dried. Samples Nos. 1 to 4 were further irradiated with electron beams at an acceleration voltage of 200 KV and an absorption dose of 3 Mrads. Thus, photographic paper supports 1 and 2 (invention) and photographic paper supports 3, 4, 5 and 6 (comparisons) were obtained.

TABLE 1

| Sample No. | Composition of Coating Solution | |
|---|---|---|
| 1. (Invention) | Crystalline silica (particle diameter: 0.6 micron, oil absorbing degree: 60 cc/100 g) | 20 parts |
| | Urethane acrylate oligomer (described in U.S. Pat. No. 4,092,173) | 20 parts |
| | Diethylene glycol diacrylate | 10 parts |
| | Methyl methacrylate | 10 parts |
| | Acetone | 40 parts |
| 2. (Invention) | Same as in Sample No. 1 except that 20 parts of synthetic alumina-silica (particle diameter: 1.1 microns, oil absorbing degree: 50 cc/100 g) was used instead of crystalline silica. | |
| 3. (Comparison) | Same as in Sample No. 1 except that 20 parts of amorphous silica (particle diameter: 3 microns, oil absorbing degree: 210 cc/100 g) was used instead of crystalline silica. | |
| 4. (Comparison) | Same as in Sample No. 1 except that 20 parts of barium sulfate (particle diameter: 0.1 micron, oil absorbing degree: 50 cc/100 g) was used instead of crystalline silica. | |
| 5. (Comparison) | Crystalline silica (particle diameter: 0.6 micron, oil absorbing degree: 60 cc/100 g) | 5 parts |
| | Gelatin | 10 parts |
| | Water | 85 parts |
| 6. (Comparison) | Amorphous silica (particle diameter: 3 microns, oil absorbing degree: 230 cc/100 g) | 5 parts |
| | Polyvinyl alcohol | 10 parts |
| | Water | 85 parts |

The graphic properties (writing quality with a pencil and blotting of an oily ink) and development adaptability (the ease of disappearing of letters by a ball-point pen) of these photographic paper supports were evaluated.

The writing quality with a pencil having a pencil hardness of "H" was evaluated visually in three grades as follows:

A: Good affinity for the pencil

B: Acceptable affinity for the pencil

X: Poor affinity for the pencil

The blotting of an oily ink was also evaluated in three grades in the same way.

The development adaptability was evaluated by A meaning that the letters written by a ball-point pen did not disappear, and X meaning that such letters did disappear.

The results are shown in Table 2.

TABLE 2

| Sample No. | Graphic Properties: Pencil | Graphic Properties: Oily Ink | Development Adaptability |
|---|---|---|---|
| Invention | | | |
| No. 1 | A | A | A |
| No. 2 | A | A | A |
| Comparison | | | |
| No. 3 | B | X | A |
| No. 4 | X | A | A |
| No. 5 | A | A | X |
| No. 6 | B | X | X |

EXAMPLE 2

Each of the five compositions shown in Table 3 was coated to a dry thickness of 30 microns on the back surface of base paper (the thickness 200 microns), and dried. Then, the coated paper was exposed to electron beam irradiation at an acceleration voltage of 200 KV and an absorption dose of 3 Mrads. The composition shown in Table 4 was coated to a dry thickness of 30 microns on the front surface of the base paper, and dried. The coated surface was exposed to electron beam irradiation in the same way as above. Thus, supports 7 and 8 for photographic paper (invention) and supports 9, 10 and 11 for photographic paper (comparison) were obtained.

TABLE 3

| Sample No. | Formulation of Coating Solution |
|---|---|
| 7. (Invention) | Same as Sample No. 1 in Example 1 |
| 8. (Invention) | Same as Sample No. 2 in Example 1 |
| 9. (Comparison) | Same as Sample No. 3 in Example 1 |
| 10. (Comparison) | Same as Sample No. 4 in Example 1 |
| 11. (Comparison) | Same as Sample No. 1 in Example 1 except that crystalline silica was not used. |

TABLE 4

| Formulation of the Surface Coating Solution | |
|---|---|
| Titanium oxide | 20 parts |
| Urethane-type acrylate oligomer (described in U.S. Pat. No. 4,092,173) | 20 parts |
| Diethylene glycol diacrylate | 10 parts |
| Methyl methacrylate | 10 parts |
| Acetone | 40 parts |

These photographic paper supports were evaluated in the same way as in Example 1, and the results are summarized in Table 5.

TABLE 5

| Sample No. | Graphic Properties: Pencil | Graphic Properties: Oily Ink | Development Adaptability |
|---|---|---|---|
| Invention | | | |
| 7 | A | A | A |
| 8 | A | A | A |
| Comparison | | | |
| 9 | B | X | A |
| 10 | X | A | A |
| 11 | X | A | A |

It is seen from the results set forth in Tables 2 (Example 1) and 5 (Example 2) that the supports for photographic paper in accordance with this invention have a high level of quality with regard to all of the above graphic properties and development adaptability.

While the invention has been described in detail and with reference to specific embodiments thereof, it will be apparent to one skilled in the art that various changes and modifications can be made therein without departing from the spirit and scope thereof.

What is claimed is:

1. A support for photographic paper, said support having formed on a back surface thereof a graphic property-imparting layer composed of (a) an inorganic pigment having a number average particle diameter of from 0.2 to 2.0 microns and an oil absorbing degree of not more than 100 cc/100 g and (b) a resin cured by irradiation with electron beams.

2. A support as in claim 1, wherein the inorganic pigment is at least one selected from the group consisting of crystalline silica and synthetic alumina-silica.

3. A support as in claim 1, wherein the support on which the graphic property-imparting layer is formed is a base paper composed mainly of natural pulp, or a support obtained by coating both surfaces of a base paper with a polyolefin.

4. A support as in claim 3, wherein the polyolefin is high-density polyethylene, low-density polyethylene, or a mixture thereof.

5. A support as in claim 1, wherein the weight ratio of (b) resin cured by irradiation to (a) inorganic pigment is from 3/1 to $\frac{1}{3}$.

6. A support as in claim 5, wherein the inorganic pigment is crystalline silica, synthetic alumina-silica, or both.

* * * * *